May 2, 1967 R. D. HANSEN 3,317,047
SEWAGE DISPOSAL SYSTEM
Filed Nov. 5, 1964

ROY D. HANSEN
*INVENTOR.*

BY.

*Townsend & Townsend*

United States Patent Office 3,317,047
Patented May 2, 1967

3,317,047
SEWAGE DISPOSAL SYSTEM
Roy Dahl Hansen, 5659 Cabot Drive,
Oakland, Calif. 94611
Filed Nov. 5, 1964, Ser. No. 409,140
11 Claims. (Cl. 210—139)

This invention relates to a sewage disposal system and method. More particularly, it relates to such a system and method especially adapted for the small quantity requirements that may be encountered on a yacht or isolated land location.

Certain areas are not feasibly attachable to modern sewage systems of the type found in cities. Typically, wilderness shelters and boats cannot be conveniently connected to an urban sewage system. In some wilderness or remote areas the terrain may consist of rock or other geological formations which do not permit the percolation required by cesspools and similar type plumbing arrangements and therefore other solutions to the waste disposal problem are required. With boats, sewage is frequently dumped directly into the surrounding waters. In harbor areas and similar locations, pollution has become a more serious problem and direct dumping of the refuse and sewage into the water can no longer be indiscriminately permitted.

The present invention provides a unit designed to process sewage so that the end products obtained from the unit can be disposed of without contamination and health hazards. The unit is capable of manufacture in a compact size and therefore it can be installed on boats and in other places where size and portability are important.

In essence, the system and method of the present invention contemplates separation of the sewage which may have been created by humans or otherwise into solids and liquids. Both of the separated phases are treated chemically to eliminate bacteria and modify other unwanted aspects of the sewage. The liquid portion can be returned directly to the environment without concern for contamination. The solids portion also is innocuous. However, even if local discharge must be avoided the solids in the end product are reduced to such small bulk that transportion to a final resting place at another location is economically plausible.

The gist of the invention lies in the harnessing of centrifugal forces for the separation of the solids from the liquids. The liquid is passed through a suitable permeable member such as a screen. However, more is required than a simple straining operation since the solid matter would otherwise rapidly and completely clog the pores of the strainer. To avoid clogging the strainer is formed as a closed loop or annular form and the solid-liquid placed on the outside thereof. The liquid is passed to the interior of the screen and from thence to a treatment chamber. When solids periodically clog the screen the screen is momentarily rotated. The centrifugal force throws the solid matter outwardly and permits passage of the remaining liquid through the screen when rotation is ceased.

Other aspects of the invention relate to the maceration of the solids, chemical treatment of the solids and liquid, and removal of residual liquid content from the solids. All of these and other deails will be more fully appreciated when the invention is considered in detail with reference to the accompanying drawings.

The accompanying drawings illustrate a preferred embodiment of the present invention.

Figure 3:
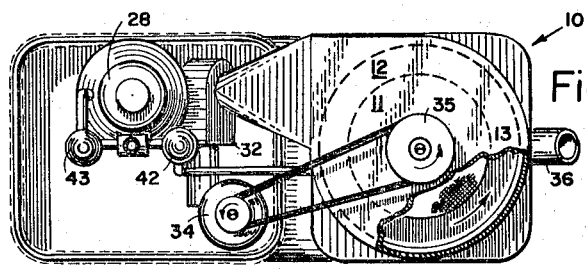
FIG. 3 shows a top elevation of the embodiment illustrated in FIG. 1 taken along the line 3—3 of FIG. 1.
Figure 2:
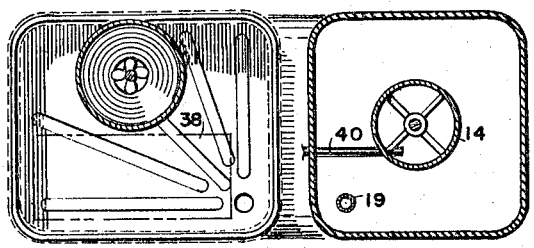
FIG. 2 shows a top elevation of the embodiment of FIG. 1 taken along the line 2—2 of FIG. 1.
Figure 1:
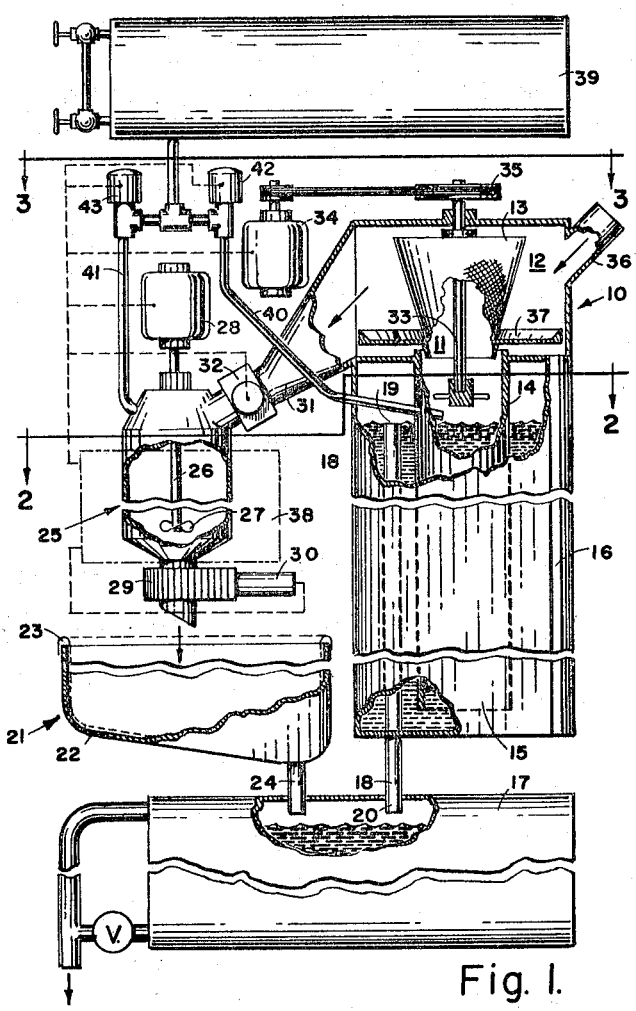
FIG. 1 shows in side elevation, with parts broken away, a sewage processing unit provided by the present invention.

Turning to the drawings, the preferred embodiment includes a solid-liquid separation chamber 10 which is segregated into an inner compartment 11 and an outer compartment 12 by a rotatable screen 13 as will be described hereinafter. Inner compartment 11 is in fluid communication with a liquid receiving chamber for first holding and treating the liquid. It takes the form of a cylinder 14. Cylinder 14 is open at the bottom 15 thereof and communicates with a secondary holding tank 16. Liquid separated in chamber 10 enters compartment 11 and proceeds downwardly through cylinder 14 out the bottom 15 thereof and into holding tank 16 to assume a level as illustrated in FIG. 1.

A third reservoir or holding unit 17 is in fluid communication with secondary holding tank 16 by means of a pipe 18 inserted within secondary holding tank 16. Pipe 18 is positioned interiorly of holding tank 16 so that one open end 19 is near the upper portion of tank 16 at the liquid level and the other open end 20 communicates with the interior of holding unit 17. With this construction liquid proceeds downwardly through cylinder 14, up through holding tank 16 and over the top of and into pipe 19. This tortuous path for the liquid provides the necessary time lag for chemicals mixed with the liquid in cylinder 14 to perform their function of bacteria reduction and purification.

The system includes a parallel path for handling the solids separated in chamber 10. At the end of the path is solids residue unit 21 which includes a trough 22 and an open sack 23 lining the inside of trough 22. Sack 23 is suitably formed from an economically disposable material such as polyethylene. Perforations are suitably made in the bottom of sack 22 to permit liquids to drain by gravity downwardly into reservoir or holding unit 17. Reservoir 17 is a common reservoir that receives liquids from both solids residue unit 21 by way of pipe 24 as well as from liquid receiving and holding units 14 and 16 by way of pipe 18.

The solids are discharged into trough 22 from a macerator 25 which includes a shaft 26 with blades 27 mounted for rotation thereon and powered by motor 28. Solids are discharged periodically from macerator 25 when gate valve 29 is opened by solenoid 30 cooperating therewith.

Solids reach macerator 25 from outer compartment 12 of separation chamber 10 through interconnecting pipe 31 which includes a solenoid and gate valve 32 positioned in pipe 31.

In the embodiment illustrated, solid-liquid separation chamber 10 has a frustoconical screen 13 mounted therein on a shaft 33 and driven by motor 34 through a suitable power train 35. Motor 34 is timed for intermittent operation. Consequently, when raw sewage containing both liquids and solids enters chamber 10 through inlet 36 in the direction shown by the arrow, the mass is disposed in outer compartment 12. Liquid begins to seep through screen 13 and down through cylinder 14. If nothing more is done the screen will soon clog and prevent substantially all of the liquid from passing through the screen. By intermittently rotating screen 13 the solids are thrown outwardly by centrifugal force and the liquid will again pass completely through the screen when the rotational movement ceases. Repetition of this action achieves a substantial separation of the solids from the liquids.

Screen 13 preferably contains an outwardly disposed annular shelf 37 at the lower part thereof for gathering solids as it accumulates during water separation through screen 13. This eliminates a build-up on the bottom of chamber 10 and keeps the mass generally moving more freely, especially during solids evacuation to macerator 25.

A timer 38 is mounted at a convenient location on the apparatus and is suitably constructed so to cause the operation of various components in the proper sequence as will be described hereinafter.

Chemicals for treating the sewage may be any of those well known in the art. In the preferred embodiment chlorine liquid is held in a tank 39. Tank 39 is connected for fluid communication to the interior of cylinder 14 and macerator 25 by pipes 40 and 41 respectively. Valve 42 is disposed in pipe 40 and valve 43 in pipe 41 to permit chlorine to enter the appropriate areas at the desired time and in the necessary amounts.

Figure 4:
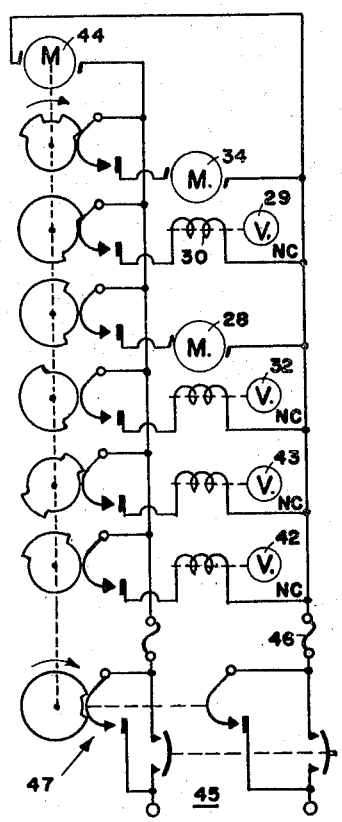
FIG. 4 shows schematically the timing cycle for the valves and motors involved in the operation of the embodiment of FIGS. 1-3.

FIG. 4 shows one usual sequence for the timer 38 in operating the above apparatus. A timer motor 44 is connected in a conventional circuit through a momentary main switch shown generally at 45. Main switch 45 can be actuated by a button or other conventional control mechanism. Alternatively, it is possible to connect switch 45 through shaft 33 of screen 13 which could also include a micro-switch on shaft 33 that is set off when a given load is placed on shelf 37.

When the circuit is closed through switch 45 timer motor 44 makes a preselected number of revolutions. For each revolution, motor 34 will be intermittently actuated twice as illustrated, although the number of pulses of the motor could obviously be selected as desired.

As illustrated, screen 13 is about to be momentarily actuated by motor 34. At this point valve 29 is open to permit discharge of previously ground contents of macerator 25. Valve 29 is closed during loading and operation of macerator 25.

At this time valve 32 is closed so that new material being processed in separator 10 will not be permitted to pass to macerator 25 before the liquid passes through screen 13. Valve 32 opens after motor 34 has been actuated twice and the liquid thereby separated through screen 13. Valve 32 is held open for loading of macerator 25 and is then closed.

Chlorine from tank 39 is periodically distributed to macerator 25 and liquid receiving chamber or cylinder 14 as required to accomplish the purification of the waste. As illustrated, valve 43 will be opened to permit chlorine to pass from tank 39 to macerator 25 twice during a given cycle of timer motor 44. The number of chlorine charges can be varied and may occur before, during, or after the macerating operation. Chlorine from tank 39 is also permitted to pass through valve 42 to cylinder 14 at a desired time and amount by opening valve 42 at a suitable time during the timing cycle as shown.

Fuses 46 may be inserted in the line as desired. Also, a main switch 47 for overrun control can be included so that a complete cycle will be assured whenever the sequence is initiated.

Although the foregoing invention has been described in some detail by way of illustration and example for purposes of clarity of understanding, it is understood that certain changes and modifiactions may be practiced within the spirit of the invention as limited only by the scope of the appended claims.

What is claimed is:

1. A sewage disposal system comprising: a liquid-solid separation chamber including a rotatably mounted liquid permeable member dividing the chamber into inner and outer compartments; means to rotate said liquid permeable member at preselected intermittent intervals; conduit means for depositing raw sewage in the outer one of said compartments; rotation of said liquid permeable member serving to dislodge solids covering the surface of said liquid permeable member to thereby permit substantially all of the liquid to pass through the member and enter the inner one of said compartments; a solids maceration chamber connected to the outer one of said compartments; a liquid treating chamber connected to the inner one of said concentric compartments; and means for injecting sewage treating chemicals in preselected amounts into said solids maceration chamber and said liquid treating chamber.

2. A sewage disposal system in accordance with claim 1 wherein said liquid permeable member is a screen in a closed loop configuration.

3. A sewage disposal system in accordance with claim 1 wherein said maceration chamber includes a shaft having blades mounted thereon, and means for rotating said shaft and blades within the maceration chamber.

4. A sewage disposal system in accordance with claim 1 and further including a solids drainage chamber connected to receive chemically treated solids from said solids maceration chamber and adapted to retain solids while permitting residual liquid to drain therefrom.

5. A sewage disposal system in accordance with claim 4 wherein said solids drainage chamber comprises a tank lined with a removable plastic sack, said sack having perforations therein for retention of solids in the sack and drainage of liquid through the perforations.

6. In a sewage treating system, means for separating the sewage into its solid and liquid components comprising: a chamber for receiving the solid-liquid combination; a rotatable annular screen mounted within the chamber to define an inner and an outer compartment in the chamber; inlet means on the outer compartment for the entrance of the liquid-solid combination; outlet means on the outer compartment for discharge of solids; outlet means on said inner compartment for liquids; valve means associated with the outer compartment permitting discharge of solids from said outer compartment at preselected times; means for intermittently rotating said annular screen at a rate sufficient to dislodge solids from the surface thereof; and timing means connected to said valve means and to said means for intermittently rotating said annular screen adapted for actuating said last-named means when said valve means is closed and before discharge of solids from said outer compartment.

7. Separation means in accordance with claim 6 and including an annular shelf extending outwardly from the bottom of said screen a distance sufficient to receive and hold solids at the lower portion of said outer compartment.

8. A sewage disposal system comprising: a liquid-solid separation chamber including a rotatably mounted annular strainer dividing the chamber into inner and outer concentric compartments; means to rotate said strainer at preselected intermittent intervals; conduit means for depositing raw sewage in the outer one of said concentric compartments; valve means permitting discharge of solids from said outer compartment at preselected times; a liquid receiving chamber in fluid communication with said inner compartment; rotation of said strainer serving to dislodge solids covering the surfaces thereof to permit substantially all of the liquid to pass through the strainer and enter the inner compartment for passage to said liquid receiving chamber; a solids maceration chamber connected to the outer one of said concentric compartments through said valve means; a chlorine tank; a first conduit from said chlorine tank to said liquid receiving chamber; valve means in said first conduit permitting chlorine to enter said liquid receiving chamber at preselected times; a second conduit between said chlorine tank and said maceration chamber; and valve means in said second conduit permitting chlorine to enter said maceration chamber at preselected times.

9. A sewage disposal system in accordance with claim 8 wherein said liquid receiving chamber is connected to said inner compartment by a pipe from said inner compartment extending into and approaching the bottom of said liquid receiving chamber, and conduit means for removing liquid from said chamber from the top of the liquid level therein.

10. A sewage disposal system in accordance with claim 8 and including a collection and drainage tank having a disposable plastic sack therein, said plastic sack having perforations to permit liquid to drain therethrough, and a conduit having a valve connecting said maceration chamber to said plastic sack.

11. A sewage disposal system in accordance with claim 10 and further including a common reservoir connected to receive drainage liquid from said perforated sack, means for flowing liquid from said inner compartment to the bottom of said liquid receiving chamber, a drain pipe in said liquid receiving chamber having an open end at the top of said chamber and communicating at its other opened end with said common reservoir whereby liquid from the upper liquid level of said liquid receiving chamber is discharged into said common reservoir.

References Cited by the Examiner
UNITED STATES PATENTS

| | | | |
|---|---|---|---|
| 2,043,458 | 6/1936 | Windecker et al. | 210—50 X |
| 2,058,026 | 10/1936 | MacCallum | 233—47 X |
| 2,151,079 | 3/1939 | Bowen | 210—60 X |
| 2,678,133 | 5/1954 | Thayer et al. | 210—360 |
| 2,709,680 | 5/1955 | Watson | 210—152 X |
| 2,858,939 | 11/1958 | Corliss | 210—60 X |
| 3,190,449 | 6/1965 | Muller | 210—334 X |

MORRIS O. WOLK, *Primary Examiner.*

M. E. ROGERS, *Assistant Examiner.*